(12) United States Patent
Wang

(10) Patent No.: US 7,270,882 B2
(45) Date of Patent: Sep. 18, 2007

(54) WEATHERABLE MULTILAYER ARTICLES AND METHOD FOR THEIR PREPARATION

(75) Inventor: Hua Wang, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 206 days.

(21) Appl. No.: 10/737,944

(22) Filed: Dec. 16, 2003

(65) Prior Publication Data

US 2004/0166323 A1 Aug. 26, 2004

Related U.S. Application Data

(63) Continuation-in-part of application No. 10/371,755, filed on Feb. 21, 2003, now abandoned.

(51) Int. Cl.
*B32B 27/36* (2006.01)
(52) U.S. Cl. .......... 428/412; 428/411.1; 524/313; 264/176.1; 264/219
(58) Field of Classification Search .......... 428/412, 428/515, 523
See application file for complete search history.

(56) References Cited

U.S. PATENT DOCUMENTS

| | | | |
|---|---|---|---|
| 2,991,273 A | 7/1961 | Hechelhammer et al. |
| 2,999,835 A | 9/1961 | Goldbert et al. |
| 3,028,365 A | 4/1962 | Schnell et al. |
| 3,030,331 A | 4/1962 | Goldberg |
| 3,148,172 A | 9/1964 | Fox |
| 3,153,008 A | 10/1964 | Fox |
| 3,169,121 A | 2/1965 | Goldberg |
| 3,207,814 A | 9/1965 | Goldberg |
| 3,271,367 A | 9/1966 | Schnell et al. |
| 3,271,368 A | 9/1966 | Goldberg et al. |
| 3,309,261 A | 3/1967 | Schiller et al. |
| 3,391,054 A | 7/1968 | Lewis et al. |
| 3,444,129 A | 5/1969 | Young, Jr. et al. |
| 3,460,961 A | 8/1969 | Young, Jr. et al. |
| 3,492,261 A | 1/1970 | Young, Jr. et al. |
| 3,503,779 A | 3/1970 | Young, Jr. et al. |
| 3,505,160 A | 4/1970 | Michaels et al. |
| 3,764,457 A | 10/1973 | Chang et al. |
| 3,791,914 A | 2/1974 | Ammons et al. |
| 3,806,486 A | 4/1974 | Endriss et al. |
| 3,965,057 A | 6/1976 | Ammons et al. |
| 4,156,069 A | 5/1979 | Prevorsek et al. |
| 4,194,038 A | 3/1980 | Baker et al. |
| 4,217,438 A | 8/1980 | Brunelle et al. |
| 4,238,596 A | 12/1980 | Quinn |
| 4,238,597 A | 12/1980 | Markezich et al. |
| 4,381,359 A | 4/1983 | Idel et al. |
| 4,438,229 A | 3/1984 | Fujimori et al. |
| 4,444,950 A | 4/1984 | Sakano et al. |
| 4,487,896 A | 12/1984 | Mark et al. |
| 4,490,506 A | 12/1984 | Sakano et al. |
| 4,503,121 A | 3/1985 | Robeson et al. |
| 4,506,065 A | 3/1985 | Miller et al. |
| 4,576,842 A | 3/1986 | Hartsing et al. |
| 4,608,417 A | 8/1986 | Giles, Jr. |
| 4,643,937 A | 2/1987 | Dickinson et al. |
| 4,695,239 A | 9/1987 | Klepsch et al. |
| 4,731,213 A | 3/1988 | Klepsch |
| 4,804,566 A | 2/1989 | Paul et al. |
| 4,895,897 A | 1/1990 | Kaufman |
| 4,931,364 A | 6/1990 | Dickinson |
| 4,992,322 A | 2/1991 | Curry et al. |
| 5,001,000 A | 3/1991 | Rohrbacher et al. |
| 5,001,193 A | 3/1991 | Golden |
| 5,030,505 A | 7/1991 | Dickinson |
| 5,188,875 A * | 2/1993 | Yamaoka et al. .......... 428/65.2 |
| 5,308,894 A | 5/1994 | Laughner |
| 5,369,154 A | 11/1994 | Laughner |
| 5,821,322 A | 10/1998 | Brunelle et al. |
| 6,136,441 A | 10/2000 | MacGregor et al. |
| 6,174,959 B1 | 1/2001 | Ciebien et al. |
| 6,180,195 B1 | 1/2001 | Ellison et al. |

(Continued)

FOREIGN PATENT DOCUMENTS

AT    410 578 B    2/2001

(Continued)

OTHER PUBLICATIONS

Cohen et al., *"Transparent Ultraviolet-Barrier Coatings"*, Journal of Polymer Science, Part A-1, vol. 9, pp. 3263-3299, 1971.

(Continued)

*Primary Examiner*—James J. Seidleck
*Assistant Examiner*—Saira B. Haider
(74) *Attorney, Agent, or Firm*—Cantor Colburn LLP

(57) ABSTRACT

Disclosed are weatherable multilayer articles comprising (i) a coating layer comprising a block copolyestercarbonate comprising structural units derived from at least one 1,3-dihydroxybenzene and at least one aromatic dicarboxylic acid, (ii) a second layer comprising a polymer comprising carbonate structural units, (iii) an adhesive tielayer comprising a copolymer with structural units derived from at least one alkenyl aromatic compound and at least one conjugated diene, and (iv) a substrate layer, wherein the coating layer is in contiguous contact with the second layer, and the adhesive tielayer is in contiguous contact with the second layer and the substrate layer. Also disclosed is a method for making the multilayer article.

60 Claims, No Drawings

U.S. PATENT DOCUMENTS

| | | | |
|---|---|---|---|
| 6,291,574 B1 * | 9/2001 | Gallucci | 524/505 |
| 6,297,300 B1 | 10/2001 | Van Nuffel | |
| 6,306,507 B1 | 10/2001 | Brunelle et al. | |
| 6,515,081 B2 | 2/2003 | Oosedo et al. | |
| 6,538,065 B1 | 3/2003 | Suriano et al. | |
| 6,549,745 B2 | 4/2003 | May et al. | |
| 6,556,798 B2 | 4/2003 | Rimai et al. | |
| 6,559,270 B1 | 5/2003 | Siclovan et al. | |
| 6,572,956 B1 | 6/2003 | Pickett et al. | |
| 6,583,256 B2 | 6/2003 | Vollenberg et al. | |
| 6,589,378 B2 | 7/2003 | Grefenstein et al. | |
| 6,617,398 B2 | 9/2003 | Yeager et al. | |
| 6,720,386 B2 | 4/2004 | Gaggar et al. | |
| 6,861,482 B2 | 3/2005 | Brunelle et al. | |
| 6,890,979 B2 | 5/2005 | Eichenauer et al. | |
| 6,900,769 B2 | 5/2005 | Schlieber et al. | |
| 2001/0036989 A1 * | 11/2001 | Rohn et al. | 524/364 |
| 2002/0177551 A1 | 11/2002 | Terman | |
| 2002/0182352 A1 | 12/2002 | Mitten et al. | |
| 2002/0197438 A1 | 12/2002 | Hay et al. | |
| 2003/0008164 A1 | 1/2003 | Klepsch | |
| 2003/0175488 A1 | 9/2003 | Asthana et al. | |
| 2003/0216539 A1 | 11/2003 | Siclovan et al. | |
| 2004/0028907 A1 | 2/2004 | Wang | |
| 2004/0142176 A1 | 7/2004 | Wang | |
| 2004/0166323 A1 | 8/2004 | Wang | |
| 2004/0175593 A1 * | 9/2004 | Davis et al. | 428/515 |
| 2004/0253428 A1 | 12/2004 | Wang et al. | |
| 2005/0158554 A1 | 7/2005 | Wang et al. | |
| 2005/0158561 A1 | 7/2005 | Wang et al. | |
| 2006/0017193 A1 | 1/2006 | Asthana et al. | |
| 2006/0019099 A1 | 1/2006 | Wang et al. | |

FOREIGN PATENT DOCUMENTS

| | | |
|---|---|---|
| DE | 101 00 745 A1 | 8/2001 |
| EP | 0 203 425 | 12/1986 |
| EP | 0 347 797 B1 | 7/1994 |
| EP | 0 857 758 | 8/1998 |
| EP | 0947562 A1 | 10/1998 |
| EP | 1 316 419 A2 | 6/2003 |
| EP | 1 124 878 B1 | 1/2004 |
| JP | 1/199841 | 8/1989 |
| WO | WO82/01098 | 1/1982 |
| WO | WO88/10188 | 12/1988 |
| WO | WO96/07541 | 3/1996 |
| WO | WO96/11983 | 4/1996 |
| WO | WO99/02339 | 1/1999 |
| WO | WO 00/26274 | 5/2000 |
| WO | WO/00/61664 | 10/2000 |
| WO | WO 00/69945 | 11/2000 |
| WO | WO 01/36535 A1 | 5/2001 |
| WO | WO 02/084129 A2 | 10/2002 |
| WO | WO 02/084129 A3 | 10/2002 |
| WO | WO 02/090109 A1 | 11/2002 |
| WO | WO 03/047857 A1 | 6/2003 |
| WO | WO 04/085102 A2 | 10/2004 |
| WO | WO 04/085102 A3 | 10/2004 |

OTHER PUBLICATIONS

Search Report dated Jan. 27, 2005.

Skeist, Irving; "Handbook of Adhesives"; Van Nostrand Reinhold, New York, Third Edition (1990); pp. 359-380.

Pizzi, A., et al; "Handbook of Adhesive Technology"; Marcel Dekker, Inc., New York—Basel—Hong Kong, pp. 405-429 (1994).

Lu, Qi-Wei, et al.; Compatibilized Blends of Thermoplastic Polyurethane (TPU) and Polypropylene; Macromol. Symp. 2003; 198; pp. 221-232.

International Search Report; International Application No. US 2004/000925; applicant's File Reference 131713-2; International Filing Date Jan. 14, 2004; Date of Mailing Jun. 24, 2004.

* cited by examiner

WEATHERABLE MULTILAYER ARTICLES AND METHOD FOR THEIR PREPARATION

CROSS-REFERENCE TO RELATED APPLICATIONS

This application is a continuation-in-part of application Ser. No. 10/371,755 filed Feb. 21, 2003 now abandoned, which is incorporated herein by reference.

BACKGROUND OF THE INVENTION

The present invention relates to weatherable multilayer resinous articles and their preparation. More particularly, it relates to multilayer articles comprising a protective block copolyestercarbonate coating, a second layer comprising a polymer comprising carbonate structural units, a substrate, and at least one adhesive tielayer between the second layer and the substrate.

Various resinous articles have a problem of long term color instability. This causes yellowing of the polymer resin, which in some embodiments detracts from its transparency and attractiveness. Loss of gloss can also be an undesirable long term phenomenon.

Yellowing of polymers is often caused by the action of ultraviolet radiation, which is why such yellowing is frequently designated "photoyellowing". Numerous means for suppressing photoyellowing have been employed and proposed. Many of these involve incorporation in the polymer of ultraviolet absorbing compounds (UVA's). For the most part, UVA's are low molecular weight compounds and they must be employed at relatively low levels, typically up to 1% by weight, to avoid degradation of the physical properties of the polymer such as impact strength and high temperature properties as reflected in heat distortion temperature. Such levels may be inadequate to afford sufficient protection.

One way of protecting a resinous article against photoyellowing and loss of gloss is to apply a coating of a weatherable second polymer, the term "weatherable" as used herein signifying resistance to such phenomena. Weatherable polymers suitable for this purpose include resorcinol isophthalate/terephthalate copolyarylates. This is the subject of Cohen et al., J. Poly. Sci., Part A-1, vol. 9, pp. 3263–3299 (1971), and certain related U.S. Patents of Monsanto Company including U.S. Pat. Nos. 3,444,129, 3,460,961, 3,492,261 and 3,503,779. Commonly owned, published application WO 00-61664 is directed to weatherable multilayer articles with coating layers comprising structural units derived from a 1,3-dihydroxybenzene organodicarboxylate. Commonly owned U.S. Pat. No. 6,306,507 is directed to weatherable multilayer articles with coating layers comprising at least one coating layer thereon, said coating layer comprising a thermally stable polymer comprising resorcinol arylate polyester chain members substantially free of anhydride linkages linking at least two mers of the polymer chain, prepared by an interfacial method.

Japanese Kokai 1/199,841 discloses articles having a substrate layer comprising at least 90 mole percent poly(ethylene terephthalate) and a gas barrier coating layer which is a polyester of resorcinol and isophthalic acid, optionally with copolyester units derived from another dicarboxylic acid such as terephthalic acid, naphthalenedicarboxylic acid or various other specifically named dicarboxylic acids. The disclosed articles may be prepared by a series of operations including co-injection molding which are essentially performed entirely in the melt, thereby overcoming the aforementioned deficiencies of solution coating. However, the only types of articles disclosed are bottles, which are produced from a co-injection molded parison by subsequent blow molding. Larger articles intended for outdoor use, such as external automobile body parts, are not disclosed and no method for their production is suggested, nor are articles in which the substrate layer is anything other than poly(ethylene terephthalate).

It remains of interest, therefore, to develop a method for preparing weatherable multilayer articles which are capable of use for such varied purposes as body parts for outdoor vehicles and devices such as automobiles, and which exhibit adequate adhesion between the various layers.

BRIEF DESCRIPTION OF THE INVENTION

The present inventors have discovered multilayer articles with coating layers which provide protection from weathering for underlying layers, and which exhibit excellent adhesion between the various layers. In one of its embodiments the present invention comprises a multilayer article comprising (i) a coating layer comprising a block copolyestercarbonate comprising structural units derived from at least one 1,3-dihydroxybenzene and at least one aromatic dicarboxylic acid, (ii) a second layer comprising a polymer comprising carbonate structural units, (iii) an adhesive tielayer comprising a copolymer with structural units derived from at least one alkenyl aromatic compound and at least one conjugated diene, and (iv) a substrate layer, wherein the coating layer is in contiguous contact with the second layer, and the adhesive tielayer is in contiguous contact with the second layer and the substrate layer.

Various other features, aspects, and advantages of the present invention will become more apparent with reference to the following description and appended claims.

DETAILED DESCRIPTION OF THE INVENTION

In the following specification and the claims which follow, reference will be made to a number of terms which shall be defined to have the following meanings. The singular forms "a", "an" and "the" include plural referents unless the context clearly dictates otherwise. "Optional" or "optionally" means that the subsequently described event or circumstance may or may not occur, and that the description includes instances where the event occurs and instances where it does not. As used herein the term "layer" is used interchangeably with the terms "film" and "sheet".

The copolyestercarbonate film in the multilayer articles of the present invention comprises at least one block copolyestercarbonate comprising alternating carbonate and arylate blocks. Such block copolyestercarbonates include polymers comprising 1,3-dihydroxybenzene structural units and aromatic dicarboxylic acid structural units of the Formula (I):

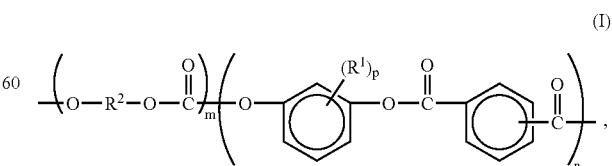

wherein each $R^1$ is independently halogen or $C_1$–$C_{12}$ alkyl, p is 0–3, each $R^2$ is independently a divalent organic radical, m is at least 1 and n is at least about 4. In some embodiments n is at least about 10, in other embodiments at least about 20 and in still other embodiments about 30–150. In some embodiments m is at least about 3, in other embodiments at least about 10 and in still other embodiments about 20–200. In other embodiments m is between about 20 and 50. Within the context of the invention "alternating carbonate and arylate blocks" means that the copolyestercarbonates comprise at least one carbonate block and at least one arylate block. In particular embodiments block copolyestercarbonates comprise at least one arylate block and at least two carbonate blocks. In another particular embodiment block copolyestercarbonates comprise an A-B-A architecture with at least one arylate block ("B") and at least two carbonate blocks ("A").

The arylate blocks contain structural units comprising 1,3-dihydroxybenzene moieties which may be unsubstituted or substituted. Alkyl substituents, if present, are often straight-chain or branched alkyl groups, and are most often located in the ortho position to both oxygen atoms although other ring locations are contemplated. Suitable $C_1$–$C_{12}$ alkyl groups include, but are not limited to, methyl, ethyl, n-propyl, isopropyl, butyl, iso-butyl, t-butyl, nonyl, decyl, and aryl-substituted alkyl, including benzyl. In some embodiments any alkyl substituent is methyl. Suitable halogen substituents include bromo, chloro, and fluoro. 1,3-Dihydroxybenzene moieties containing a mixture of alkyl and halogen substituents are also suitable. The value for p may be in one embodiment 0–3, in another embodiment 0–2, and in still another embodiment 0–1. In one embodiment a 1,3-dihydroxybenzene moiety is 2-methylresorcinol. In many embodiments a 1,3-dihydroxybenzene moiety is unsubstituted resorcinol in which p is zero. Polymers containing mixtures of 1,3-dihydroxybenzene moieties, such as a mixture of unsubstituted resorcinol with 2-methylresorcinol are also contemplated.

In the arylate structural units said 1,3-dihydroxybenzene moieties are bound to aromatic dicarboxylic acid moieties which may be monocyclic moieties, such as isophthalate or terephthalate or their halogen-substituted derivatives; or polycyclic moieties, illustrative examples of which include biphenyl dicarboxylate, diphenylether dicarboxylate, diphenylsulfone dicarboxylate, diphenylketone dicarboxylate, diphenylsulfide dicarboxylate, or naphthalenedicarboxylate. In some embodiments polycyclic moieties comprise naphthalene-2,6-dicarboxylate; or mixtures of monocyclic and/or polycyclic aromatic dicarboxylates. In many embodiments the aromatic dicarboxylic acid moieties are isophthalate and/or terephthalate. Either or both of said moieties may be present. In one embodiment both are present in a molar ratio of isophthalate to terephthalate in the range of about 0.20–5.0:1, while in another embodiment both are present in a molar ratio of isophthalate to terephthalate in the range of about 0.25–4.0:1. When the isophthalate to terephthalate ratio is greater than about 4.0:1, then unacceptable levels of cyclic oligomer may form in some embodiments. When the isophthalate to terephthalate ratio is less than about 0.25:1, then unacceptable levels of insoluble polymer may form in some other embodiments. In some embodiments the molar ratio of isophthalate to terephthalate is about 0.40–2.5:1, and in other embodiments about 0.67–1.5:1.

In various embodiments the arylate block segments in the copolyestercarbonates are substantially free of anhydride linkages linking at least two mers of the polymer chain. Substantially free of anhydride linkages in the present context means that the copolyestercarbonates show decrease in molecular weight in some embodiments of less than 10% and in other embodiments of less than 5% upon heating said copolyestercarbonates at a temperature of about 280–290° C. for five minutes.

In the carbonate blocks of the copolyestercarbonates each $R^2$ of Formula (I) is independently an organic radical derived from a dihydroxy compound. For the most part, at least about 60 percent of the total number of $R^2$ groups in the polymer are aromatic organic radicals and the balance thereof are aliphatic, alicyclic, or aromatic radicals. Suitable $R^2$ radicals include m-phenylene, p-phenylene, 4,4'-biphenylene, 4,4'-bi(3,5-dimethyl)phenylene, 2,2-bis(4-phenylene)propane and similar radicals such as those which correspond to the dihydroxy-substituted aromatic hydrocarbons disclosed by name or formula (generic or specific) in U.S. Pat. No. 4,217,438. In some embodiments of the invention dihydroxy compounds include 6-hydroxy-1-(4'-hydroxyphenyl)-1,3,3-trimethylindane, 4,4'-(3,3,5-trimethylcyclohexylidene)diphenol; 1,1-bis(4-hydroxy-3-methylphenyl)cyclohexane; 2,2-bis(4-hydroxyphenyl)propane (commonly known as bisphenol-A); 4,4-bis(4-hydroxyphenyl)heptane; 2,2-bis(4-hydroxy-3,5-dimethylphenyl)propane; 2,2-bis(4-hydroxy-3-methylphenyl)propane; 2,2-bis (4-hydroxy-3-ethylphenyl)propane; 2,2-bis(4-hydroxy-3-isopropylphenyl)propane; 2,4'-dihydroxydiphenylmethane; bis(2-hydroxyphenyl)methane; bis(4-hydroxy-phenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(3-phenyl-4-hydroxyphenyl)-propane; bis(4-hydroxyphenyl)cyclohexylmethane; 2,2-bis(4-hydroxyphenyl)-1-phenylpropane; 3,5,3',5'-tetrachloro-4,4'-dihydroxyphenyl) propane; 2,4'-dihydroxyphenyl sulfone; dihydroxynaphthalene; 2,6-dihydroxynaphthalene; hydroquinone, resorcinol; $C_{1-3}$ alkyl-substituted resorcinols; methyl resorcinol; catechol; 1,4-dihydroxy-3-methylbenzene; bis(4-hydroxyphenyl)sulfide; bis(4-hydroxyphenyl) sulfone; bis(4-hydroxyphenyl)ether; bis(4-hydroxyphenyl) sulfoxide; 4,4'-oxydiphenol; 2,2-bis(4-hydroxyphenyl) hexafluoropropane; 1,2-bis(4-hydroxyphenyl)ethane; 2,2-bis(4-hydroxyphenyl)butane; 2,2-bis(4-hydroxyphenyl)-2-methylbutane; 1,1-bis(4-hydroxyphenyl)cyclohexane; 4,4'-dihydroxydiphenyl; 2-(3-methyl-4-hydroxyphenyl-2-(4-hydroxyphenyl)propane; 2-(3,5-dimethyl-4-hydroxyphenyl)-2-(4-hydroxyphenyl)propane; 2-(3-methyl-4-hydroxyphenyl)-2-(3,5-dimethyl-4-hydroxyphenyl) propane; bis(3,5-dimethylphenyl-4-hydroxyphenyl) methane; 1,1-bis(3,5-dimethylphenyl-4-hydroxyphenyl) ethane; 2,2-bis(3,5-dimethylphenyl-4-hydroxyphenyl) propane; 2,4-bis(3,5-dimethylphenyl-4-hydroxyphenyl)-2-methylbutane; 3,3-bis(3,5-dimethylphenyl-4-hydroxyphenyl)pentane; 1,1-bis(3,5-dimethylphenyl-4-hydroxyphenyl)cyclopentane; 1,1-bis(3,5-dimethylphenyl-4-hydroxyphenyl)cyclohexane; bis(3,5-dimethyl-4-hydroxyphenyl)sulfoxide; bis(3,5-dimethyl-4-hydroxyphenyl) sulfone; bis(3,5-dimethylphenyl-4-hydroxyphenyl)sulfide; and the like. In a particular embodiment the dihydroxy compound comprises bisphenol A.

Suitable dihydroxy compounds also include those containing indane structural units such as represented by the Formula (II), which compound is 3-(4-hydroxyphenyl)-1,1,3-trimethylindan-5-ol, and by the Formula (II), which compound is 1-(4-hydroxyphenyl)-1,3,3-trimethylindan-5-ol:

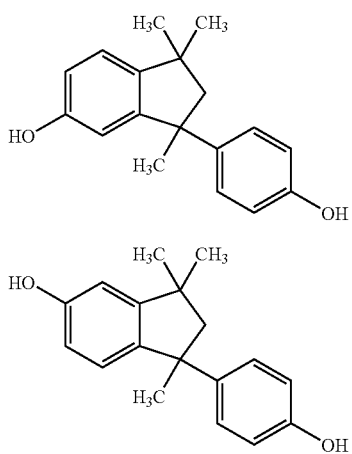

(II)

(III)

Included among suitable dihydroxy-substituted aromatic hydrocarbons are the 2,2,2',2'-tetrahydro-1,1'-spirorbi[1H-indene]diols having Formula (IV):

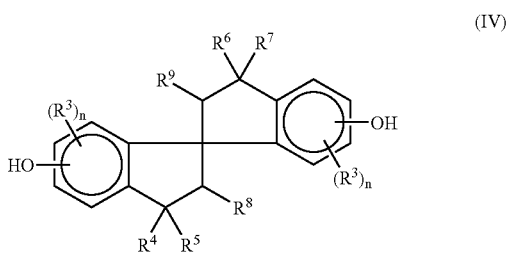

(IV)

wherein each $R^3$ is independently selected from monovalent hydrocarbon radicals and halogen radicals; each $R^4$, $R^5$, $R^6$, and $R^7$ is independently $C_1$–$C_6$ alkyl; each $R^8$ and $R^9$ is independently H or $C_1$–$C_6$ alkyl; and each n is independently selected from positive integers having a value of from 0 to 3 inclusive. In a particular embodiment the 2,2,2',2'-tetrahydro-1,1'-spirobi[1H-indene]-diol is 2,2,2',2'-tetrahydro-3,3,3',3'-tetramethyl-1,1'-spirorbi[1H-indene]-6,6'-diol (sometimes know as "SBI"). Mixtures comprising at least one of any of the foregoing dihydroxy-substituted aromatic hydrocarbons may also be employed.

The term "alkyl" as used in the various embodiments of the present invention is intended to designate both linear alkyl, branched alkyl, aralkyl, cycloalkyl, bicycloalkyl, tricycloalkyl and polycycloalkyl radicals containing carbon and hydrogen atoms, and optionally containing atoms in addition to carbon and hydrogen, for example atoms selected from Groups 15, 16 and 17 of the Periodic Table. The term "alkyl" also encompasses that alkyl portion of alkoxide groups. In various embodiments normal and branched alkyl radicals are those containing from 1 to about 32 carbon atoms, and include as illustrative non-limiting examples $C_1$–$C_{32}$ alkyl optionally substituted with one or more groups selected from $C_1$–$C_{32}$ alkyl, $C_3$–$C_{15}$ cycloalkyl or aryl; and $C_3$–$C_{15}$ cycloalkyl optionally substituted with one or more groups selected from $C_1$–$C_{32}$ alkyl. Some particular illustrative examples comprise methyl, ethyl, n-propyl, isopropyl, n-butyl, sec-butyl, tertiary-butyl, pentyl, neopentyl, hexyl, heptyl, octyl, nonyl, decyl, undecyl and dodecyl. Some illustrative non-limiting examples of cycloalkyl and bicycloalkyl radicals include cyclobutyl, cyclopentyl, cyclohexyl, methylcyclohexyl, cycloheptyl, bicycloheptyl and adamantyl. In various embodiments aralkyl radicals are those containing from 7 to about 14 carbon atoms; these include, but are not limited to, benzyl, phenylbutyl, phenylpropyl, and phenylethyl. In various embodiments aryl radicals used in the various embodiments of the present invention are those substituted or unsubstituted aryl radicals containing from 6 to 18 ring carbon atoms. Some illustrative non-limiting examples of these aryl radicals include $C_6$–$C_{15}$ aryl optionally substituted with one or more groups selected from $C_1$–$C_{32}$ alkyl, $C_3$–$C_{15}$ cycloalkyl or aryl. Some particular illustrative examples of aryl radicals comprise substituted or unsubstituted phenyl, biphenyl, toluyl and naphthyl. Heteroaryl groups comprise those containing from about 3 to about 10 ring carbon atoms, and include, but are not limited to, triazinyl, pyrimidinyl, pyridinyl, furanyl, thiazolinyl and quinolinyl.

In some embodiments each $R^2$ is an aromatic organic radical and in particular embodiments a radical of the Formula (V):

$$-A^1-Y-A^2-,\qquad(V)$$

wherein each $A^1$ and $A^2$ is a monocyclic divalent aryl radical and Y is a bridging radical in which one or two carbon atoms separate $A^1$ and $A^2$. The free valence bonds in Formula (V) are usually in the meta or para positions of $A^1$ and $A^2$ in relation to Y. Compounds in which $R^2$ has Formula (V) are bisphenols, and for the sake of brevity the term "bisphenol" is sometimes used herein to designate the dihydroxy-substituted aromatic hydrocarbons; it should be understood, however, that non-bisphenol compounds of this type may also be employed as appropriate.

In Formula (V), $A^1$ and $A^2$ typically represent unsubstituted phenylene or substituted derivatives thereof, illustrative substituents (one or more) being alkyl, alkenyl, and halogen (particularly bromine). In many embodiments $A^1$ and $A^2$ represent unsubstituted phenylene radicals. Both $A^1$ and $A^2$ may be p-phenylene, although both may be o- or m-phenylene or one o- or m-phenylene and the other p-phenylene.

The bridging radical, Y, is one in which one or two atoms separate $A^1$ from $A^2$. In a particular embodiment one atom separates $A^1$ from $A^2$. Illustrative radicals of this type are —C=O, —O—, —S—, —SO— or —SO$_2$—, methylene, cyclohexylmethylene, 2-[2.2.1]-bicycloheptylmethylene, ethylene, isopropylidene, neopentylidene, cyclohexylidene, cyclopentadecylidene, cyclododecylidene, and adamantylidene. In some embodiments such radicals are gem-alkylene radicals. Also included, however, are unsaturated radicals. For reasons of availability and particular suitability for the purposes of this invention a particular bisphenol is 2,2-bis(4-hydroxyphenyl)propane (hereinafter referred to as bisphenol A or BPA), in which Y is isopropylidene and $A^1$ and $A^2$ are each p-phenylene.

Depending upon whether or not any unreacted 1,3-dihydroxybenzene moiety is present in the reaction mixture as described hereinafter, $R^2$ in the carbonate blocks may consist of or at least partially comprise a radical derived from a 1,3-dihydroxybenzene moiety. Therefore, in one embodiment of the present invention the copolyestercarbonates comprise carbonate blocks with $R^2$ radicals derived from a dihydroxy compound identical to at least one 1,3-dihydroxybenzene moiety in the polyarylate blocks. In another embodiment the copolyestercarbonates comprise carbonate blocks with $R^2$ radicals derived from a dihydroxy compound different from any 1,3-dihydroxybenzene moiety in the polyarylate blocks. In yet another embodiment the copolyestercarbonates comprise carbonate blocks containing a mixture of $R^2$ radicals derived from dihydroxy compounds at least one of which is the same as and at least one of which is different from any 1,3-dihydroxybenzene moiety in the polyarylate blocks. When a mixture of $R^2$ radicals derived from dihydroxy compounds is present, then the molar ratio of dihydroxy compounds identical to those present in the polyarylate blocks to those dihydroxy compounds different from those present in the polyarylate blocks is typically about 1:999 to 999:1. In some particular embodiments the copolyestercarbonates comprise carbonate blocks containing a mixture of $R^2$ radicals derived from at least two of unsubstituted resorcinol, a substituted resorcinol, and bisphenol A.

Diblock, triblock, and multiblock copolyestercarbonates are encompassed in the present invention. The chemical linkages between blocks comprising arylate chain members and blocks comprising organic carbonate chain members typically comprise a carbonate linkage between a diphenol residue of an arylate moiety and a —(C=O)—O— moiety of an organic carbonate moiety, although other types of linkages such as ester and/or anhydride are also possible. A typical carbonate linkage between said blocks is shown in Formula (VI), wherein $R^1$ and p are as previously defined:

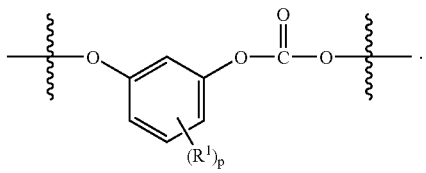

In one embodiment the copolyestercarbonate is substantially comprised of a diblock copolymer with a carbonate linkage between an arylate block and an organic carbonate block. In another embodiment the copolyestercarbonate is substantially comprised of a triblock carbonate-ester-carbonate copolymer with carbonate linkages between the arylate block and organic carbonate end-blocks. Copolyestercarbonates with at least one carbonate linkage between an arylate block and an organic carbonate block are typically prepared from 1,3-dihydroxybenzene arylate-containing oligomers containing at least one and often two hydroxy-terminal sites (hereinafter sometimes referred to as hydroxy-terminated polyester intermediate).

In another embodiment the copolyestercarbonate comprises arylate blocks linked by carbonate linkages as shown in Formula (VII):

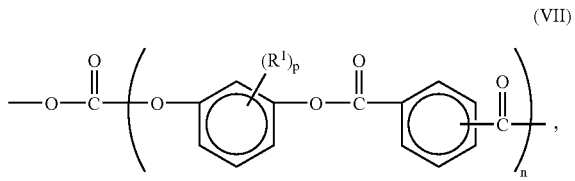

wherein $R^1$, p, and n are as previously defined, and the arylate structural units are as described for Formula (I). Copolyestercarbonates comprising Formula (VII) may arise from reaction of hydroxy-terminated polyester intermediate with a carbonate precursor in the substantial absence of any dihydroxy compound different from the hydroxy-terminated polyester intermediate. In other embodiments the copolyestercarbonate may comprise a mixture of copolyestercarbonates with different structural units and different architectures, for example as described herein.

In the copolyestercarbonates suitable for use in the present invention the distribution of the blocks may be such as to provide a copolymer having any desired weight proportion of arylate blocks in relation to carbonate blocks. The copolyestercarbonates contain in one embodiment about 5% to about 99% by weight arylate blocks; in another embodiment about 20% to about 98% by weight arylate blocks; in another embodiment about 40% to about 98% by weight arylate blocks; in another embodiment about 60% to about 98% by weight arylate blocks; in another embodiment about 80% to about 96% by weight arylate blocks; and in still another embodiment about 85% to about 95% by weight arylate blocks.

The copolyestercarbonate film can comprise other components such art-recognized additives including, but not limited to, stabilizers, color stabilizers, heat stabilizers, light stabilizers, auxiliary UV screeners, auxiliary UV absorbers, flame retardants, anti-drip agents, flow aids, plasticizers, ester interchange inhibitors, antistatic agents, mold release agents, and colorants such as metal flakes, glass flakes and beads, ceramic particles, other polymer particles, dyes and pigments which may be organic, inorganic or organometallic. In a particular embodiment a copolyestercarbonate-comprising layer is substantially transparent.

The thickness of the coating layer is sufficient to provide protection of the underlying layers from weathering, in particular from the effects of UV radiation, as measured, for example, by retention of such properties as gloss and by color stability in any colorant-comprising layer. In one embodiment the thickness of the coating layer is in a range of about 2–2,500 microns, in another embodiment in a range of about 10–250 microns, and in another embodiment in a range of about 50–175 microns.

If desired, an overlayer may be included over the coating layer, for example to provide abrasion or scratch resistance. In a particular embodiment a silicone overlayer is provided over a copolyestercarbonate-comprising coating layer.

Multilayer articles of the present invention comprise a second layer comprising a polymer comprising carbonate structural units. In one embodiment the polymer of the second layer comprises at least one homopolycarbonate. Any polycarbonate capable of being processed into a film or sheet is suitable. In various embodiments suitable polycarbonates comprise those with structural units derived from monomers selected from the group consisting of all those described above for use in the carbonate blocks of the block copolyestercarbonate. In particular embodiments polycarbonate film comprises bisphenol A homo- or copolycarbonates. In another particular embodiment polycarbonate film comprises bisphenol A homopolycarbonate. In other embodiments polycarbonate film comprises a blend of at least one first polycarbonate with at least one other polymeric resin, examples of which include, but are not limited to, a second polycarbonate differing from said first polycarbonate either in structural units or in molecular weight or in both these parameters, or a polyester, or an addition polymer such as acrylonitrile-butadiene-styrene copolymer or acrylonitrile-styrene-acrylate copolymer.

The second layer can comprise other components such as art-recognized additives including, but not limited to, stabilizers, color stabilizers, heat stabilizers, light stabilizers, UV screeners, UV absorbers, flame retardants, anti-drip agents, flow aids, plasticizers, ester interchange inhibitors, antistatic agents, mold release agents, fillers, and colorants such as metal flakes, glass flakes and beads, ceramic particles, other polymer particles, dyes and pigments which may be organic, inorganic or organometallic. In a particular embodiment a second layer further comprises at least one colorant. In another particular embodiment a second layer comprises both a bisphenol A polycarbonate and at least one colorant selected from the group consisting of dyes, pigments, glass flakes, and metal flakes. In a particular embodiment metal flake comprises aluminum flake. In another particular embodiment metal flake comprises aluminum flake which has dimensions of about 20–70 microns. Further examples of colorants include, but are not limited to, Solvent Yellow 93, Solvent Yellow 163, Solvent Yellow 114/Disperse Yellow 54, Solvent Violet 36, Solvent Violet 13, Solvent Red 195, Solvent Red 179, Solvent Red 135, Solvent Orange 60, Solvent Green 3, Solvent Blue 97, Solvent Blue 104, Solvent Blue 104, Solvent Blue 101, Macrolex Yellow E2R, Disperse Yellow 201, Disperse Red 60, Diaresin Red K, Colorplast Red LB, Pigment Yellow 183, Pigment Yellow 138, Pigment Yellow 110, Pigment Violet 29, Pigment Red 209, Pigment Red 209, Pigment Red 202, Pigment Red 178, Pigment Red 149, Pigment Red 122, Pigment Orange 68, Pigment Green 7, Pigment Green 36, Pigment Blue 60, Pigment Blue 15:4, Pigment Blue 15:3, Pigment Yellow 53, Pigment Yellow 184, Pigment Yellow 119, Pigment White 6, Pigment Red 101, Pigment Green 50, Pigment Green 17, Pigment Brown 24, Pigment Blue 29, Pigment Blue 28, Pigment Black 7, Lead Molybdates, Lead Chromates, Cerium Sulfides, Cadmium Sulfoselenide, and Cadmium Sulfide. Illustrative extending and reinforcing fillers include, but are not limited to, silica, silicates, zeolites, titanium dioxide, stone powder, glass fibers or spheres, carbon fibers, carbon black, graphite, calcium carbonate, talc, mica, lithopone, zinc oxide, zirconium silicate, iron oxides, diatomaceous earth, calcium carbonate, magnesium oxide, chromic oxide, zirconium oxide, aluminum oxide, crushed quartz, calcined clay, talc, kaolin, asbestos, cellulose, wood flour, cork, cotton and synthetic textile fibers, especially reinforcing fillers such as glass fibers, carbon fibers, and metal fibers.

The thickness of the second layer is in one embodiment in a range of about 2–2,500 microns, in another embodiment in a range of about 10–1,000 microns, and in another embodiment in a range of about 50–600 microns. An adhesive tielayer may optionally be present between the copyester-carbonate-comprising coating layer and the second layer comprising carbonate structural units. In various embodiments said optional adhesive tielayer comprises those known in the art which provide adhesion to a surface or layer comprising a polymer comprising carbonate structural units. In some embodiments said optional adhesive tielayer is transparent and in other embodiments said optional adhesive tielayer has the same color as the second layer.

In various embodiments copolymers with structural units derived from at least one alkenyl aromatic compound and at least one conjugated diene which are suitable for use in the adhesive tielayer of multilayer articles of the invention comprise those known in the art which provide adhesion to a surface or layer comprising a polymer comprising carbonate structural units. In particular embodiments alkenyl aromatic compounds comprise styrene, alpha-methyl styrene, 2-methylstyrene, 3-methylstyrene, 4-methylstyrene, 2-t-butylstyrene, 3-t-butylstyrene, 4-t-butylstyrene, styrenes having from 1 to 5 halogen substituents on the aromatic ring, and the like, and combinations thereof. Conjugated dienes comprise butadiene, isoprene and the like. The copolymer, and in particular the diene-derived structural units of the copolymer, may be hydrogenated or unhydrogenated. Suitable copolymers may include those with linear, star, diblock, triblock or radial structure. The copolymer comprising an alkenyl aromatic compound and a conjugated diene may be a random copolymer, a partial random copolymer or a block copolymer such as, but not limited to, an A-B, A-B-A or A-B-A-B block copolymer wherein "A" and "B" represent an alkenyl aromatic compound and a conjugated diene block respectively. In some particular embodiments suitable copolymers comprise structural units derived from styrene and at least one conjugated diene, illustrative examples of which include, but are not limited to, polystyrene-b-poly (butadiene) copolymer (SB); polystyrene-b-poly(isoprene)-b-polystyrene copolymer (SIS); polystyrene-b-poly(butadiene)-b-polystyrene copolymer (SBS); polystyrene-b-poly (ethylene-propylene)-b-polystyrene copolymer (SEPS); polystyrene-b-poly(ethylene-butylene)-b-polystyrene copolymer (SEBS); and polystyrene-b-poly(ethylene-ethylene/propylene)-b-polystyrene copolymer (SEEPS). Suitable copolymers typically comprise about 10–80 wt. % or 12–70 wt. % or 12–65 wt. % structural units derived from an alkenyl aromatic compound such as styrene. In a particular embodiment suitable copolymers for adhesive tielayers comprise elastomeric polystyrene-b-poly(styrene-butadiene)-b-polystyrene copolymer (S-S/B-S) block copolymers containing a statistical S/B sequence and containing up to about 65 wt. % structural units derived from styrene. Illustrative examples of S-S/B-S block copolymers include STYROFLEX available from BASF Corporation. In a particular embodiment a suitable S-S/B-S block copolymer has a block length ratio of 15:70:15, wherein the S/B mid-block is a statistical or random copolymer of styrene and butadiene. In another particular embodiment a suitable tielayer comprises a blend of a polycarbonate with at least one copolymer comprising structural units derived from at least one alkenyl aromatic compound and at least one conjugated diene. In still another particular embodiment a suitable tielayer comprises a blend of an S-S/B-S block copolymer with bisphenol A polycarbonate.

In another particular embodiment suitable copolymers for tielayers comprise elastomeric polystyrene-b-poly(isoprene)-b-polystyrene (S-I-S) or hydrogenated S-I-S (hS-I-S) block copolymers wherein the isoprene linkages are primarily 1,2 or 3,4 linkages. Illustrative examples of such copolymers comprise HYBRAR, obtained from Kuraray Co. HYBRAR is a block copolymer comprising polystyrene end blocks and a vinyl-bonded, polyisoprene-rich middle block, optionally hydrogenated. In a preferred embodiment the block comprising polyisoprene units in HYBRAR is hydrogenated. The middle block of HYBRAR is miscible with polyolefins such as polypropylene. Usually at least about 50% of the isoprene linkages of S-I-S and hS-I-S copolymers are 1,2 or 3,4 linkages with the remainder of the isoprene linkages being 1,4 linkages. In some particular embodiments about 55% or about 70% of the isoprene linkages of S-I-S or hS-I-S copolymers are 1,2 or 3,4 linkages. The preferred S-I-S or hS-I-S copolymer comprises greater than about 10% and less than about 30% units derived from styrene with the remainder comprised of structural units derived from isoprene. A particularly preferred S-I-S or hS-I-S copolymer has about 20% units derived from styrene with the remainder comprised of structural units derived from isoprene. In another particular embodiment a suitable tielayer comprises a blend of an S-S/B-S or S-B-S block copolymer with an S-I-S or hS-I-S copolymer.

In other embodiments suitable copolymers with structural units derived from at least one alkenyl aromatic compound and at least one conjugated diene comprise those which have been chemically modified with at least one polar functionalization agent selected from the group consisting of acrylic acid, methacrylic acid, maleic acid, maleic anhydride, itaconic acid, itaconic anhydride, fumaric acid, malic acid and monoesters of maleic acid and fumaric acid with monohydric alcohols. In some embodiments a suitable copolymer is one that has been modified with maleic anhydride. In a particular embodiment a suitable copolymer is an S-EB-S type block polymer which has been grafted with maleic anhydride. Suitable tielayers typically have a glass transition temperature as measured by DSC of less than about 10° C., or less than about 0° C., or less than about minus 15° C., or less than about minus 20° C., or less than about minus 30° C. In the context of the present invention suitable tielayers do not include those which comprise acrylonitrile-butadiene-styrene (ABS) materials, which have thermoplastic, non-elastomeric styrene-acrylonitrile copolymer side chains grafted on an elastomeric base polymer of butadiene.

In various embodiments adhesive tielayer thickness may be in a range of between about 8 microns and about 2500 microns; in other embodiments in a range of between about 25 microns and about 2000 microns; in other embodiments in a range of between about 50 microns and about 1500 microns; in other embodiments in a range of between about 100 microns and about 1300 microns; and in still other embodiments in a range of between about 500 microns and about 1300 microns. In some other embodiments adhesive tielayer thickness may be in a range of between about 10 microns and about 650 microns; in other embodiments in a range of between about 10 microns and about 400 microns; and in still other embodiments in a range of between about 10 microns and about 260 microns. In some embodiments suitable adhesives tielayers may be in the form of film or sheet, which in various embodiments may be optically clear or transparent.

It is well known that mismatch between coefficients of thermal expansion (CTE) of a cap layer or coating layer and an underlying substrate may induce very high thermal stress and cause delamination in the final multilayer articles. In various embodiments the adhesive tielayer can be formulated for applications with multilayer articles comprising said second layer and substrate layer with different coefficients of thermal expansion (CTE), for example, a high CTE second layer on a low CTE substrate. In various embodiments the adhesive tielayer has a modulus at room temperature in one embodiment in a range of between about $10^5$ and about $10^9$ pascals and in another embodiment in a range of between about $10^6$ and $10^8$ pascals.

The material of the substrate layer in the articles of this invention may comprise at least one material selected from the group consisting of a thermoplastic resin, a thermoset resin, a metal, a ceramic, a glass, and a cellulosic material. There is no particular limitation on the thickness of the substrate layer provided that a multilayer article comprising the substrate can be processed into a final desired form. In a particular embodiment the material of the substrate layer may be at least one thermoplastic polymer, whether addition or condensation prepared. Thermoplastic polymers include, but are not limited to, polycarbonates, particularly aromatic polycarbonates, polyacetals, polyarylene ethers, polyphenylene ethers, polyarylene sulfides, polyphenylene sulfides, polyimides, polyamideimides, polyetherimides, polyetherketones, polyaryletherketones, polyetheretherketones, polyetherketoneketones, polyamides, polyesters, liquid crystalline polyesters, polyesteresters, polyetheramides, polyesteramides, and polyestercarbonates (other than those employed for the coating layer, as defined herein). In some embodiments polycarbonates and polyesters are preferred. A substrate layer may additionally contain art-recognized additives including, but not limited to, colorants, pigments, dyes, impact modifiers, stabilizers, color stabilizers, heat stabilizers, light stabilizers, UV screeners, UV absorbers, flame retardants, anti-drip agents, fillers, flow aids, plasticizers, ester interchange inhibitors, antistatic agents, and mold release agents.

Suitable substrate polycarbonates (sometimes referred to hereinafter as "PC") comprise those with structural units derived from monomers selected from the group consisting of all those described above for use in the carbonate blocks of the block copolyestercarbonate. In some embodiments the polycarbonates are bisphenol A homo- and copolycarbonates. In other embodiments a suitable polycarbonate is one which is different from that polycarbonate layer which is in contact with the copolyestercarbonate coating layer. In various embodiments the weight average molecular weight of a substrate polycarbonate ranges from about 5,000 to about 100,000; in other embodiments the weight average molecular weight of a substrate polycarbonate ranges from about 25,000 to about 65,000.

The polycarbonate substrate may also be a copolyestercarbonate (other than that copolyestercarbonate employed for the coating layer as defined herein). Such copolymers typically comprise, in addition to the organic carbonate units, ester units such as isophthalate and/or terephthalate. In various embodiments copolyestercarbonates which find use as substrates in the instant invention and the methods for their preparation are disclosed in, for example, U.S. Pat. Nos. 3,030,331; 3,169,121; 3,207,814; 4,194,038; 4,156,069; 4,238,596; 4,238,597; 4,487,896; and 4,506,065.

Polyester substrates include, but are not limited to, poly (alkylene dicarboxylates), especially poly(ethylene terephthalate) (sometimes referred to hereinafter as "PET"), poly (1,4-butylene terephthalate) (sometimes referred to hereinafter as "PBT"), poly(trimethylene terephthalate), poly(ethylene naphthalate), poly(butylene naphthalate), poly(cyclohexanedimethanol terephthalate), poly(cyclohexanedimethanol-co-ethylene terephthalate), and poly(1,4-cyclohexanedimethyl-1,4-cyclohexanedicarboxylate). Also included are polyarylates, illustrative examples of which include those comprising structural units derived from bisphenol A, terephthalic acid, and isophthalic acid.

Suitable addition polymer substrates include homo- and copolymeric aliphatic olefin and functionalized olefin polymers (which are homopolymers and copolymers comprising structural units derived from aliphatic olefins or functionalized olefins or both), and their alloys or blends. Illustrative examples include, but are not limited to, polyethylene, polypropylene, thermoplastic polyolefin (TPO), ethylene-propylene copolymer, poly(vinyl chloride), poly(vinyl chloride-co-vinylidene chloride), poly(vinyl fluoride), poly(vinylidene fluoride), poly(vinyl acetate), poly(vinyl alcohol), poly(vinyl butyral), poly(acrylonitrile), acrylic polymers such as those of (meth)acrylamides or of alkyl (meth) acrylates such as poly(methyl methacrylate) (PMMA), and polymers of alkenylaromatic compounds such as polystyrenes, including syndiotactic polystyrene. In some embodiments addition polymer substrates are polystyrenes and especially the so-called acrylonitrile-butadiene-styrene (ABS) and acrylonitrile-styrene-acrylate (ASA) materials, which contain thermoplastic, non-elastomeric styrene-acrylonitrile copolymer side chains grafted on an elastomeric base polymer of butadiene and alkyl acrylate, respectively.

Blends of any of the foregoing polymers may also be employed as substrates. Typical blends include, but are not limited to, those comprising PC/ABS, PC/ASA, PC/PBT, PC/PET, PC/polyetherimide, PC/polysulfone, polyester/polyetherimide, PMMA/acrylic rubber, polyphenylene ether-polystyrene, polyphenylene ether-polypropylene, polyphenylene ether-polyamide or polyphenylene ether-polyester. Although the substrate layer may incorporate other thermoplastic polymers, the above-described polycarbonates and/or addition polymers often constitute the major proportion thereof.

The substrate layer in the multilayer articles of this invention may also comprise at least one of any cured, uncured or at least partially cured thermoset resin and the use of the term "thermoset resin" in the present context refers to any of these options. Suitable thermoset resin substrates include, but are not limited to, those derived from epoxys, cyanate esters, unsaturated polyesters, diallylphthalate, acrylics, alkyds, phenol-formaldehyde, novolacs, resoles, bismaleimides, PMR resins, melamine-formaldehyde, urea-formaldehyde, benzocyclobutanes, hydroxymethylfurans, and isocyanates. In one embodiment of the invention the thermoset resin substrate comprises a RIM material. In another embodiment of the invention the thermoset resin substrate further comprises at least one thermoplastic polymer, such as, but not limited to, polyphenylene ether, polyphenylene sulfide, polysulfone, polyetherimide, or polyester. Said thermoplastic polymer is typically combined with thermoset monomer mixture before curing of said thermoset. In a particular embodiment a substrate of the invention comprises an acrylic ester-derived thermoset resin containing a polyphenylene ether. In another particular embodiment a thermoset resin substrate of the invention comprises a vinyl monomer-containing thermoset resin, illustrative examples of which include styrene monomer-containing thermoset resin, optionally containing at least one thermoplastic resin such as, but not limited to, polyphenylene ether.

In one embodiment of the invention a thermoplastic or thermoset substrate layer also incorporates at least one filler and/or colorant. Illustrative extending and reinforcing fillers, and colorants include silica, silicates, zeolites, titanium dioxide, stone powder, glass fibers or spheres, carbon fibers, carbon black, graphite, calcium carbonate, talc, mica, lithopone, zinc oxide, zirconium silicate, iron oxides, diatomaceous earth, calcium carbonate, magnesium oxide, chromic oxide, zirconium oxide, aluminum oxide, crushed quartz, calcined clay, talc, kaolin, asbestos, cellulose, wood flour, cork, cotton and synthetic textile fibers, especially reinforcing fillers such as glass fibers, carbon fibers, and metal fibers, as well as colorants such as metal flakes, glass flakes and beads, ceramic particles, other polymer particles, dyes and pigments which may be organic, inorganic or organometallic. In another embodiment the invention encompasses multilayer articles comprising a filled thermoset substrate layer such as a sheet-molding compound (SMC).

The substrate layer may also comprise at least one cellulosic material including, but not limited to, wood, paper, cardboard, fiber board, particle board, plywood, construction paper, Kraft paper, cellulose nitrate, cellulose acetate butyrate, and like cellulosic-containing materials. The invention also encompasses blends of at least one cellulosic material and either at least one thermoset resin (particularly an adhesive thermoset resin), or at least one thermoplastic polymer (particularly a recycled thermoplastic polymer, such as PET or polycarbonate), or a mixture of at least one thermoset resin and at least one thermoplastic polymer.

Multilayer articles encompassed by the invention also include those comprising at least one glass layer. Typically any glass layer is a substrate layer, although multilayer articles comprising a copolyestercarbonate coating layer interposed between a glass layer and a substrate layer are also contemplated. Depending upon the nature of coating and glass layers, at least one adhesive tielayer may be beneficially employed between any glass layer and any copolyestercarbonate coating layer. The adhesive tielayer may be transparent, opaque or translucent. For some embodiments it is preferred that any such interlayer be optically transparent in nature and generally have a transmission of greater than about 60% and a haze value less than about 3% with no objectionable color.

Metal articles exposed to UV-light may exhibit tarnishing and other detrimental phenomena. In another embodiment the invention encompasses multilayer articles comprising at least one metal layer as substrate layer. Representative metal substrates include those comprising brass, aluminum, magnesium, chrome, iron, steel, copper, and other metals or alloys or articles containing them, which may require protection from UV-light or other weather phenomena.

For metals to be used for applications such as automotive body panels, pretreatment of the metal surface may be necessary to clean the metal surfaces, for example to improve adhesion by providing an inert surface comprising a chemical conversion coating, and/or to prevent the spread of corrosion. Methods for surface treatment of metal substrates are known in the art and are described in many references, for example in "Automotive Paints and Coatings", edited by G. Fettis, VCH Publishers, 1995. In some embodiments pretreatment is carried out in a number of stages, including 1) cleaning (rust removal, degreasing, rinsing), 2) chemical conversion coating, and 3) electrodeposition (normally referred as e-coating).

In another embodiment the present invention provides methods for making multilayer articles comprising the layer components described herein. In some embodiments the coating layer comprising a block copolyestercarbonate and the second layer comprising a polymer comprising carbonate structural units are formed into a copolyestercarbonate/carbonate-comprising polymer assembly comprising at least two layers. Such an assembly can be made by known methods, illustrative examples of which include coextrusion of films or sheets of the two materials. In other embodiments such an assembly can be made by lamination, or solvent or melt coating, or extrusion coating. In a particular embodiment application of the coating layer to the second layer is performed in the melt. Suitable methods for application include fabrication of a separate sheet of coating layer followed by application to the second layer, as well as simultaneous production of both layers. Thus, there may be employed such illustrative methods as molding, compression molding, thermoforming, co-injection molding, coextrusion, extrusion coating, overmolding, multi-shot injection molding, sheet molding and placement of a film of the coating layer material on the surface of the second layer followed by adhesion of the two layers, typically in an injection molding apparatus; e.g., in-mold decoration. These operations may be conducted under art-recognized conditions.

Assemblies comprising coating layer and second layer may comprise the combined thicknesses of the layers. Such an assembly has a thickness in some embodiments in a range between about 10 microns and about 2500 microns; in other embodiments in a range between about 10 microns and about 1000 microns; in other embodiments in a range between about 10 microns and about 500 microns; and in still other embodiments in a range between about 10 microns and about 250 microns.

In some embodiments of the invention the copolyestercarbonate/carbonate-comprising polymer assembly can be formed adjacent to the adhesive tielayer upon the substrate layer by use of known methods, for example lamination using heat and pressure as in compression molding or using other forming techniques such as vacuum forming or hydroforming. Alternatively, the adhesive tielayer may be applied by means known in the art to at least one side of said second layer either before or after formation of an assembly of second layer with coating layer, followed by formation and bonding of the combined layers adjacent to substrate. Alternatively, the said second layer can be formed adjacent to the substrate layer comprising an adhesive tielayer, followed by formation of coating layer adjacent to the second layer. For adhesive tielayer already in film form the adhesive tielayer can be formed adjacent to the copolyestercarbonate/carbonate-comprising polymer assembly either after or during a process (such as coextrusion) to make said assembly, and become an integral part of the film assembly which can be directly formed adjacent to the substrates using processes as described, for example by use of such means as heat and pressure. Alternatively, said second layer can be formed adjacent to an adhesive film for example by directly coextruding said layers together, followed by formation of an assembly with copolyestercarbonate coating layer using known methods such as lamination. The copolyestercarbonate/carbonate-comprising polymer assembly can be optionally thermoformed to the approximate shape of the article before molding. In various embodiments any formation step of one layer adjacent to another layer may be performed by known means such as by lamination.

When the substrate is a thermoset resin, the adhesive tielayer may be applied to said substrate either before said thermoset is cured or after said thermoset is cured or when said thermoset is at least partially cured. The adhesive tielayer may be applied to said thermoset substrate in unitary form, for example, as a film, or after the adhesive tielayer has been formed adjacent to said second layer or after the adhesive tielayer has been formed adjacent to said second layer in combination with said coating layer.

In one particular embodiment a multilayer article comprising (i) a coating layer comprising a block copolyestercarbonate comprising structural units derived from at least one 1,3-dihydroxybenzene and at least one aromatic dicarboxylic acid, (ii) a second layer comprising a polymer comprising carbonate structural units, (iii) an adhesive tielayer comprising a copolymer with structural units derived from at least one alkenyl aromatic compound and at least one conjugated diene, and (iv) a substrate layer comprising an uncured thermoset resin, wherein the coating layer is in contiguous contact with the second layer, and the adhesive layer is in contiguous contact with the second layer and the substrate layer; may be prepared by a method comprising the steps of (a) assembling the coating layer, second layer, adhesive layer, and substrate by any known method, and (b) subjecting the assembly to conditions under which the thermoset is cured by any known method. In some embodiments conditions under which the thermoset may be cured include subjecting the assembly to heat. In other embodiments the multilayer article exhibits a ninety-degree peel force of at least 700 Newtons per meter after the thermoset resin substrate is cured.

It is also within the scope of the invention to apply in the melt a structure comprising the coating layer, second layer, and adhesive tielayer to a substrate layer. This may be achieved by known methods, for example in one embodiment, by charging an injection mold with the structure comprising the coating layer, second layer, and adhesive tielayer, and injecting the substrate behind it. By this method, in-mold decoration and the like are possible. In one embodiment both sides of the substrate layer may receive the other layers, while in another embodiment they are applied to only one side of the substrate layer.

The multilayer articles comprising the various layer components of this invention are typically characterized by the usual beneficial properties of the substrate layer, in addition to weatherability as may be evidenced by such properties as improved initial gloss, improved initial color, improved resistance to ultraviolet radiation and maintenance of gloss, improved impact strength, and resistance to organic solvents encountered in their final applications. Depending upon such factors as the coating layer/substrate combination, the multilayer articles may possess recycling capability, which makes it possible to employ the regrind material as a substrate for further production of articles of the invention. The multilayer articles often exhibit low internal thermal stress induced from CTE mismatch between layers. The multilayer articles may also possess excellent environmental stability, for example thermal and hydrolytic stability.

Multilayer articles which can be made which comprise the various layer components of this invention include articles for OVAD applications; exterior and interior components for aircraft, automotive, truck, military vehicle (including automotive, aircraft, and water-borne vehicles), scooter, and motorcycle, including panels, quarter panels, rocker panels, vertical panels, horizontal panels, trim, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; optical lenses; ophthalmic lenses; corrective ophthalmic lenses; implantable ophthalmic lenses; wall panels, and doors; counter tops; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; shoe laces; articles made from plastic-wood combinations; golf course markers; utility pit covers; computer housings; desk-top computer housings; portable computer housings; lap-top computer housings; palm-held computer housings; monitor housings; printer housings; keyboards; FAX machine housings; copier housings; telephone housings; phone bezels; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications. The invention further contemplates additional fabrication operations on said articles, such as, but not limited to, molding, in-mold decoration, baking in a paint oven, lamination, and/or thermoforming.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

In the following examples the copolyestercarbonate-polycarbonate film assembly comprised a layer of copolyestercarbonate film and a layer of polycarbonate film. The copolyestercarbonate film comprised a copolyestercarbonate with arylate structural units derived from unsubstituted resorcinol, isophthalic acid, and terephthalic acid, and carbonate structural units derived from bisphenol A. The polycarbonate film comprised bisphenol A polycarbonate. The abbreviation "SMC" means sheet molding compound. NORYL PX was a blend of polyphenylene ether and polystyrene, and was obtained from General Electric Plastics. NORYL PPX was a blend of polyphenylene ether and polypropylene, and was obtained from General Electric Plastics. CYCOLAC was an acrylonitrile-butadiene-styrene (ABS) resin obtained from General Electric Plastics. CYCOLOY was a blend of bisphenol A polycarbonate and acrylonitrile-butadiene-styrene resin obtained from General Electric Plastics. GELOY was an acrylonitrile-styrene-acrylate (ASA) resin obtained from General Electric Plastics. GTX was a compatibilized blend of polyphenylene ether and polyamide obtained from General Electric Plastics. VALOX was a poly(butylene terephthalate) obtained from General Electric Plastics.

The abbreviation "TSN" means thermoset NORYL, a material obtained from General Electric Plastics. TSN comprised a major amount of a polyphenylene ether and a minor amount of a vinyl monomer composition, along with various amounts of fillers, additives, and curing agents. The polyphenylene ether was preferably a poly(2,6-dimethyl-1, 4-phenylene ether) (PPE) or poly(2,6-dimethyl-14-phenylene-co-2,3,6-trimethyl-1,4-phenylene ether), wherein greater than 5%, more preferably greater than 50%, most preferably greater than 90% of the polyphenylene ether hydroxyl groups have been capped. The capping group may contain acrylic, methacrylic or allylic functionality, and preferably methacrylic functionality. The polyphenylene ether may contain internal olefinic groups produced, for example, by reaction of internal repeat units with a alkenyl halide or alkenoyl halide or unsaturated carboxylic acid anhydride, such as allyl bromides, methacrylic acid halides, or methacrylic acid anhydrides. Such reaction may take place in the presence or absence of a basic reagent such as an amine or alkyl lithium reagent. The vinyl monomer composition comprised one or more monomers selected from the group consisting of a styrenic, acrylic and allylic monomer, preferably a blend of two or more of these monomers; more preferably a blend of a styrenic and an acrylic monomer; and most preferably a blend of styrene and a polyfunctional acrylate. TSN may contain from 0.5–95%, preferably 5–60% and most preferably 10–50% by weight polyphenylene ether. TSN may also contain from 95–0.5% by weight of a vinyl monomer composition. Such compositions may further contain other initiators; colorants; fillers, both polymeric, organic and inorganic; additives such as mold release agents; low profile additives; and the like. Inorganic fillers such as calcium carbonate are often included at levels of 0–250 parts by weight based on the TSN composition. Various combinations possible in the thermoset NORYL composition are further described in U.S. Pat. No. 6,617,398.

Samples were cut into 2.54 centimeter (cm) wide stripes and tested for peel resistance of the adhesive bond using a 90-degree peel test with a crosshead separation speed of 2.54 cm per minute using an Instron testing device (Model 4505). This adhesion test method is well known to those skilled in the art and is generally described in such references as U.S. Pat. No. 3,965,057. The testing apparatus in this test procedure consisted of a series of movable rollers or supports which allowed the test specimen to be peeled at a constant 90-degree angle along its entire uncut length. The apparatus consisted of a series of five 1.27 cm rollers which were geometrically affixed to two side supports and a base plate. The two lower rollers were adjustable so that the apparatus could accommodate test specimens varying in thickness. A suitable top clamp was used for securing the plastic layer. The test specimen was 15.2 cm in length and 2.54 cm in width. It was insured that a portion of the test specimen remained unbonded. At least 3 specimens were tested for each adhesive sample. In the actual testing procedure, the fixture was affixed to the movable head of the testing machine in a position which would cause the peeled plastic layer to form a 90-degree angle with the test specimen during the test. The test specimen was positioned in the fixture and the free skin clamped securely. The clamp was then pinned to the top head of the testing machine. With no load on the test specimen, the weighing apparatus was then balanced to zero. Provision was made to autograph the peel load versus displacement of the head for a peel distance of at least 10.2 cm. Neglecting the first 2.54 cm of peel, the load required to peel the plastic layer was taken from the autographic curve. The peel strength (P) was then calculated as follows:

$$P = \frac{\text{peeling load (Newtons)}}{\text{width of specimen (meters)}}.$$

In addition, certain test specimens were evaluated using a 180-degree T-peel test performed according to ASTM D1876.

EXAMPLE 1

Laminates of STYROFLEX onto polycarbonate by compression molding: An elastomeric S-S/B-S block copolymer, STYROFLEX 2G 66 resin (sometimes referred to hereinafter as "STYROFLEX"), was obtained from BASF Corporation. STYROFLEX films of 1.6 millimeters (mm)×102 mm×152 mm in dimension were made by injection molding process. The film was placed on top of a piece of 0.5 mm bisphenol A polycarbonate film and the assembly was placed in a Carver press. It was heated on both sides at approximately 130° C. under 10.34 megapascals pressure for 4 minutes. The film was well adhered to the substrate. The 90-degree peel force was found to be 17,862 Newtons per linear meter; the polycarbonate film was torn during the peel test.

EXAMPLE 2

In-mold decoration: A 0.5 mm×89 mm×102 mm bisphenol A polycarbonate film was placed in the cavity of a 4.8 mm×102 mm×102 mm plaque mold. STYROFLEX resin was injection molded behind the polycarbonate film. The polycarbonate film was found to adhere well to the STYROFLEX substrate. The 90-degree peel force was found to be about 18,387 Newtons per linear meter; the polycarbonate film was torn during the peel test.

EXAMPLE 3

Laminates of STYROFLEX onto SMC by compression molding: A 1.6 mm thick STYROFLEX film was laminated to the polycarbonate side of a 0.76 mm copolyestercarbonate-polycarbonate film assembly at 110° C. and 345 kilopascals for 2 minutes using a hot press. Class A unsaturated polyester resin SMC from Jet Molding Company was used in this example. The copolyestercarbonate-polycarbonate film assembly with STYROFLEX film laminated on the polycarbonate side was put on top of an SMC charge. The assembly was then placed in a Carver press. It was heated on both sides at 130° C. under 13.79 megapascals pressure for 4 minutes to ensure the complete cure of the SMC. The film adhesion strength to Jet SMC was found to be 3362 Newtons per liner meter as measured by the 90 degree peel test at 2.54 cm/min rate. The failure mode was cohesive SMC.

EXAMPLES 4–16

In-mold decoration: NORYL PPX 7110, 7112 and 7115 resins, NORYL PX 0888 and 0844 resins, VALOX 195 and 315 resins, CYCOLOY MC8002 resin, and GELOY XP4034 resins were obtained from GE Plastics. Polypropylene homopolymer PP1120 was obtained from GE Polymerland. OREVAC SPP SM7-001, a chemically functionalized syndiotactic polypropylene (sPP) with a medium content of maleic anhydride (0.4% by weight) was obtained from AtoFina. ESCORENE PP8224 comprising polypropylene structural units was obtained from ExxonMobil. PMMA DQ501 was obtained from Rohm and Hass. Crystal polystyrene PS 1600 was obtained from Nova Chemicals, and CAPRON 1250 Nylon 6 was obtained from Honeywell. STYROFLEX films of 1.6 mm×102 mm×152 mm in dimension were made by an injection molding process. The STYROFLEX film was placed in the cavity of a 4.8 mm×102 mm×102 mm plaque mold and thermoplastic resins, as those listed in Table 1, were injection molded behind it to create an in-mold decorated plaque with a STYROFLEX layer and a substrate layer. The 90-degree peel strength was tested; data are listed in Table 1.

TABLE 1

| Example | Material | Peel Strength (N/m) | Failure Mode |
|---|---|---|---|
| 4 | GELOY XP4034 | 6427 | Peel arm stretched/torn |
| 5 | CYCOLOY MC8002 | 6935 | Peel arm stretched/torn |
| 6 | NORYL PPX 7110 | 6094 | Peel arm stretched/torn |
| 7 | NORYL PPX 7112 | 7968 | Peel arm stretched/torn |
| 8 | NORYL PPX 7115 | 6129 | Peel arm stretched/torn |
| 9 | Nylon 6 CAPRON 1250 | 7110 | Peel arm stretched/torn |
| 10 | Crystal PS Nova 1600 | 5464 | Interfacial |
| 11 | PP1120 | 8266 | Peel arm stretched/torn |
| 12 | OREVAC SPP SM7-001 | 2557 | Interfacial |
| 13 | ESCORENE PP8224 | 3520 | Interfacial |
| 14 | PMMA DQ501 | 6444 | Peel arm stretched/torn |
| 15 | VALOX 195 | 7968 | Peel arm stretched/torn |
| 16 | VALOX 315 | 7968 | Interfacial/peel arm stretched |

COMPARATIVE EXAMPLES 1–10

Comparative examples were prepared without tielayer. A 0.5 mm×89 mm×102 mm bisphenol A polycarbonate film was placed in the cavity of a 4.8 mm×102 mm×102 mm plaque mold. Various resins were injection molded behind the polycarbonate film. Jet SMC was molded behind the polycarbonate side of a 0.76 mm copolyestercarbonate-polycarbonate film assembly similar to the process described in Example 3. The 90-degree peel strength was tested; data are listed in Table 2. The copoluestercarbonate-polycarbonate film assembly was found to adhere poorly to these substrates when a tielayer was absent.

TABLE 2

| Comparative Example | Material | Peel Strength (N/m) |
|---|---|---|
| C1 | NORYL PPX 7110 | N/A* |
| C2 | NORYL PPX 7112 | N/A* |
| C3 | NORYL PPX 7115 | N/A* |
| C4 | CYCOLAC EPBM 3570 | <525 |
| C5 | CYCOLAC X37 | <525 |
| C6 | CYCOLOY MC8002 | 2224 |
| C7 | GELOY XP4025 | <525 |
| C8 | PP1120 | N/A* |
| C9 | ESCORENE PP8224 | N/A* |
| C10 | Jet SMC | <525 |

*Film fell apart; unable to measure

EXAMPLES 17–19

Extrusion coating and in-mold-decoration: A 0.38 mm thick STYROFLEX layer was extrusion coated on the back of a 0.5 mm thick bisphenol A polycarbonate film at 221° C. The polycarbonate film with STYROFLEX extrusion coated on the backside was then inserted in the cavity of a 4.8 mm×102 mm×102 mm plaque mold, and CYCOLOY and NORYL resins were injection molded behind the STYROFLEX film to make polycarbonate/STYROFLEX/substrate multilayer articles. The 90-degree peel strength was tested;

data are listed in Table 3. It was found that STYROFLEX worked as an effective tie layer for polycarbonate adhesion to these substrates.

TABLE 3

| Example | Substrate | Peel Strength (N/m) | Failure Mode |
| --- | --- | --- | --- |
| 17 | CYCOLOY MC8002 | 4168 | Interfacial |
| 18 | NORYL PX 0888 | 4571 | Interfacial |
| 19 | NORYL PX 0844 | 4606 | Interfacial |

EXAMPLE 20

Cycle crack test: Samples prepared as in example 2 were subjected to temperature and humidity cycling following the full cycle crack resistance test protocol described hereinabove. The peel strength results were found to be in the range of 5779 to 18,387 Newtons per linear meter; the PC film was torn during the peel test.

EXAMPLES 21–28

Cycle crack test: Samples prepared as in examples 3–16 were subjected to temperature and humidity cycling following the full cycle crack resistance test protocol described hereinabove. The 90-degree peel strength was tested; data are listed in Table 4.

TABLE 4

| Example | Material | Peel Strength (N/m) | Failure Mode |
| --- | --- | --- | --- |
| 21 | GELOY XP4034 | 6147 | Peel arm stretched/torn |
| 22 | CYCOLOY MC8002 | 7793 | Peel arm stretched/torn |
| 23 | NORYL PPX 7110 | 6007 | Peel arm stretched/torn |
| 24 | NORYL PPX 7112 | 6567 | Peel arm stretched/torn |
| 25 | NORYL PPX 7115 | 7478 | Peel arm stretched/torn |
| 26 | Nylon 6 CAPRON 1250 | 6672 | Peel arm stretched/torn |
| 27 | Crystal PS Nova 1600 | 5131 | Peel arm stretched/torn |
| 28 | SMC | 5359 | Cohesive SMC |

EXAMPLE 29

A bisphenol A polycarbonate layer, a middle layer of KRATON FG1019X (an S-EB-S type block polymer which had been grafted with about 2 wt. % maleic anhydride), and an ESCORENE PP 8224 layer were co-extruded into a 191 mm wide by 0.2 mm thick 3-layer film at Kraton Inc. A 180-degree T-peel test was performed at a peel rate of 25 mm per minute. The average 180-degree peel force was found to be 981 Newtons per linear meter; the failure occurred interfacially between polycarbonate and KRATON. During the peel test, the thin KRATON/ESCORENE layer (thickness 0.11 mm) was stretched by 50%.

EXAMPLE 30

KRATON MB1000, an experimental grade of compounded KRATON FG1901X with oil, was obtained from Kraton Inc. MB1000 pellets were compressed into a 0.25 mm film at a pressure of about 20.68 megapascals at 100° C. for 5 minutes. A 0.25 mm thick polycarbonate film and polycarbonate plaques of 64 mm×127 mm×3.2 mm in dimension were dried in a convection oven at 105° C. overnight. KRATON MB1000 film was stacked between 0.25 mm polycarbonate film and 3.2 mm thick polycarbonate plaque and the assembly was placed into a 64 mm×127 mm×3.2 mm Teflon frame in a Carver press. The assembly was heated on both sides at approximately 120° C. under 13.79 megapascals pressure for 5 minutes. The average 90-degree peel force for this polycarbonate/KRATON/polycarbonate structure was found to be 1716 Newtons per linear meter; the failure occurred interracially between polycarbonate and KRATON.

EXAMPLE 31

KRATON MB1000 film and bisphenol A polycarbonate film were dried as in Example 30. ESCORENE PP8224 plaques of 64 mm×127 mm×3.2 mm in dimension were dried at 70° C. overnight. KRATON MB1000 film was stacked between 0.25 mm polycarbonate film and 3.2 mm thick ESCORENE plaque, and the assembly was placed into a 64 mm×127 mm×3.2 mm Teflon frame in a Carver press. The assembly was heated on both sides at approximately 120° C. under 13.79 megapascals pressure for 5 minutes. The average 90-degree peel force for this polycarbonate/KRATON/ESCORENE structure was found to be 1786 Newtons per linear meter.

EXAMPLES 32–34

HYBRAR H7125 (referred to hereinafter as HYBRAR), obtained from Kuraray Co., was a hydrogenated block copolymer comprising polystyrene end blocks and a vinyl bonded, polyisoprene-rich middle block. Films of HYBRAR with dimensions 6 cm×10.2 cm×15.2 cm were made by an injection molding process. The HYBRAR film was placed in the cavity of the mold, and either OREVAC sPP SM7–001 or ESCORENE PP8224, or a bisphenol A polycarbonate resin (BPA-PC) was injection molded behind the HYBRAR film. The HYBRAR film was found to adhere well to the various substrates. The 90-degree peel strength values are shown in Table 5. In all cases, the peel arm was continuously stretched and no delamination was observed.

TABLE 5

| Example | Material | Peel Strength (Newtons per linear meter) | Apparent failure mode |
| --- | --- | --- | --- |
| 32 | OREVAC sPP | 3450 | Peel arm stretch, no delamination |
| 33 | ESCORENE PP8224 | 3047 | Peel arm stretch, no delamination |
| 34 | BPA-PC | 2977 | Peel arm stretch, no delamination |

EXAMPLES 35–37

Adhesion Environmental Stability Tests: Multilayer articles were prepared as in Examples 32–34 and subjected to a full cycle crack resistance test under varying conditions of temperature and humidity. Each full cycle involved holding the sample successively for 24 hours at 84° C., 16 hours at 38° C. and 98% relative humidity, 6 hours at minus 29° C., and 2 hours at 23° C. Each sample was subjected to 15 cycles. All samples were visually inspected after the full cycle crack test and were found to have no macroscopic delamination or other film-related failure. The treated samples were then cut into 2.54 cm. by 15.2 cm. test specimens for 90-degree peel test. The measured peel strength was listed in Table 6. The results showed that HYBRAR adhesion to sPP, impact polypropylene, and BPA-PC is environmentally stable, as adhesion strength remains excellent after the full cycle crack test protocol.

TABLE 6

| Example | Material | Peel Strength (Newtons per linear meter) | Apparent failure mode |
|---|---|---|---|
| 35 | OREVAC sPP | 2907 | Peel arm stretch, no delamination |
| 36 | ESCORENE PP8224 | 3310 | Peel arm stretch, no delamination |
| 37 | BPA-PC | 2942 | Peel arm stretch, no delamination |

EXAMPLE 38

A 0.64 mm thick HYBRAR film was made by pressing injection molded 1.6 mm thick HYBRAR films at 130° C. and 0.69 megapascals for 5 minutes. This HYBRAR film was then laminated to the polycarbonate side of a 0.76 mm thick copolyestercarbonate-polycarbonate film assembly at 130° C. and 1.38 megapascals for 4 minutes using a hot press. This new film assembly was placed in the cavity of a 4.8 mm×102 mm×102 mm plaque mold, and ESCORENE PP8224 was injection molded behind the HYBRAR film to create a multilayer article comprising copolyestercarbonate-polycarbonate film assembly, HYBRAR tielayer and ESCORENE substrate. The adhesion of the copolyestercarbonate-polycarbonate film assembly to the substrate was found to be excellent. The measured adhesion strength was about 7968 Newtons per meter. The failure mode was a combination of cohesive substrate, cohesive tielayer, and interfacial polycarbonate/tielayer.

EXAMPLES 39–43

In-mold decoration: HYBRAR 7125 films of 1.6 mm×102 mm×152 mm in dimension were made by an injection molding process. Individual samples of HYBRAR film were placed in the cavity of a 4.8 mm×102 mm×102 mm plaque mold and thermoplastic resins, as those listed in Table 6, were injection molded behind the film to create an in-mold decorated plaque with a HYBRAR layer and a substrate layer. The 90-degree peel strength was tested; data are listed in Table 6. The thermoplastic resins showed excellent adhesion to the HYBRAR film.

TABLE 6

| Example | Material | Peel Strength (N/m) | Failure Mode |
|---|---|---|---|
| 39 | NORYL PPX 7112 | 5709 | Peel arm stretched/no delamination |
| 40 | GELOY XP4034 | 4589 | Peel arm stretched/no delamination |
| 41 | CYCOLOY MC8002 | 4956 | Peel arm stretched/no delamination |
| 42 | CYCOLAC EPBM | 4588 | Peel arm stretched/no delamination |
| 43 | CYCOLAC X37 3570 | 5289 | Peel arm stretched/no delamination |

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All Patents cited herein are incorporated herein by reference.

The invention claimed is:

1. A multilayer article comprising:
   a coating layer comprising a block copolyestercarbonate comprising structural units derived from a 1,3-dihydroxybenzene and an aromatic dicarboxylic acid;
   a second layer comprising a polymer comprising carbonate structural units;
   an adhesive tielayer comprising a copolymer with structural units derived from an alkenyl aromatic compound and a conjugated diene comprising a member selected from the group consisting of polystyrene-b-poly(styrene-butadiene)-b-polystyrene copolymer, and a blend of polystyrene-b-poly(styrene-butadiene)-b-polystyrene block copolymer with a polycarbonate; and
   a substrate layer;
   wherein the coating layer is in contiguous contact with the second layer, and the adhesive tielayer is in contiguous contact with the second layer and the substrate layer.

2. The article of claim 1 wherein the coating layer comprises a 1,3-dihydroxybenzene selected from the group consisting of unsubstituted resorcinol, 2-methyl resorcinol, and mixtures thereof.

3. The article of claim 2 wherein the 1,3-dihydroxybenzene is unsubstituted resorcinol.

4. The article of claim 1 wherein the aromatic dicarboxylic acid is selected from the group consisting of isophthalic acid, terephthalic acid, naphthalene-2,6-dicarboxylic acid, and mixtures thereof.

5. The article of claim 4 wherein the aromatic dicarboxylic acid is a mixture of isophthalic acid and terephthalic acid.

6. The article of claim 5 wherein the ratio of isophthalic-derived structural units to terephthalic-derived structural units is about 0.25–4.0:1.

7. The article of claim 5 wherein the ratio of isophthalic-derived structural units to terephthalic-derived structural units is about 0.40–2.5:1.

8. The article of claim 1 wherein the copolyestercarbonate comprises about 10% to about 99% by weight arylate blocks.

9. The article of claim 1 wherein the copolyestercarbonate comprises about 60% to about 98% by weight arylate blocks.

10. The article of claim 1 wherein the carbonate portion of the copolyestercarbonate comprises structural units derived from bisphenol A.

11. The article of claim 1 wherein the second layer comprises a bisphenol A polycarbonate.

12. The article of claim 1 wherein the second layer further comprises a colorant selected from the group consisting of dyes, pigments, metal flakes, and glass flakes.

13. The article of claim 1 wherein the multilayer article exhibits a ninety-degree peel force of at least 700 Newtons per meter.

14. The article of claim 13 wherein the multilayer article exhibits a ninety-degree peel force of at least 1700 Newtons per meter.

15. The article of claim 1 wherein the substrate layer comprises a material selected from the group consisting of a thermoplastic resin, a thermoset resin, a metal, a ceramic, a glass, and a cellulosic material.

16. The article of claim 15 wherein the substrate layer comprises a thermoplastic resin selected from the group consisting of condensation polymers, polycarbonates, aromatic polycarbonates, bisphenol A polycarbonate, polyacetals, polyarylene ethers, polyphenylene ethers, polyarylene sulfides, polyphenylene sulfides, polyimides, polyamideimides, polyetherimides, polyetherketones, polyaryletherketones, polyetheretherketones, polyetherketoneketones, polyamides, copolyamides, polyesters, liquid crystalline polyesters, polyetheresters, polyetheramides, polyesteramides, polyestercarbonates, poly(alkylene dicarboxylates), poly(ethylene terephthalate), poly(1,4-butylene terephthalate), poly(trimethylene terephthalate), poly(ethylene naphthalate), poly(butylene naphthalate), poly(cyclohexanedimethanol terephthalate), poly(cyclohexanedimethanol-co-ethylene terephthalate), poly(1,4-cyclohexanedimethyl-1,4-cyclohexanedicarboxylate); polyarylates, a polyarylate comprising structural units derived from bisphenol A, terephthalic acid, and isophthalic acid; addition polymers, homo- and copolymeric aliphatic olefin and functionalized olefin polymers, polyethylene, polypropylene, thermoplastic polyolefin, ethylene-propylene copolymer, poly(vinyl chloride), poly(vinyl chloride-co-vinylidene chloride), poly(vinyl fluoride), poly(vinylidene fluoride), poly(vinyl acetate), poly(vinyl alcohol), poly(vinyl butyral), poly(acrylonitrile), acrylic polymers, poly(meth)acrylamides, polyalkyl(meth) acrylates, poly(methyl methacrylate) polymers of alkenylaromatic compounds, polystyrenes, syndiotactic polystyrene; acrylonitrile-butadiene-styrene (ABS), and acrylonitrile-styrene-acrylate (ASA), copolymers; and blends thereof.

17. The article of claim 1 wherein thicknesses of layers are: a coating layer of about 2–2,500 microns; a second layer of about 2–2,500 microns; and an adhesive tielayer of about 8–2,500 microns.

18. The article of claim 1 which is an OVAD device; exterior or interior component for aircraft, automotive, truck, military vehicle; military automobile, military aircraft, military water-borne vehicle, scooter, motorcycle, including a panel, quarter panel, rocker panel, vertical panel, horizontal panel, trim, pillar, center post, fender, door, decklid, trunklid, hood, bonnet, roof, bumper, fascia, grill, mirror housing, pillar applique, cladding, body side molding, wheel cover, hubcap, door handle, spoiler, window frame, headlamp bezel, headlamp, tail lamp, tail lamp housing, tail lamp bezel, license plate enclosure, roof rack, or running board; an enclosure, housing, panel, or part for outdoor vehicles and devices; an enclosure for an electrical or telecommunication device; outdoor furniture; aircraft component; exterior or interior component for a boat or item of marine equipment, including trim, an enclosure, or housing; an outboard motor housing; depth finder housing, personal water-craft; jet-ski; pool; spa; hot-tub; step; step covering; a building or construction application including glazing, roof, window, floor, decorative window furnishing or treatment; a treated glass cover for a pictures, paintings, poster, or display item; an optical lens; ophthalmic lens; corrective ophthalmic lens; implantable ophthalmic lens; a wall panel or door; a counter top; protected graphic; an outdoor or indoor sign; an enclosure, housing, panel, or part for an automatic teller machine (ATM); an enclosure, housing, panel, or part for a lawn or garden tractor, lawn mower, or tool, including a lawn or garden tool; window or door trim; an item of sports equipment or a toy; an enclosure, housing, panel, or part for a snowmobile; a recreational vehicle panel or component; an item of playground equipment; a shoe lace; an articles made from plastic-wood combinations; a golf course marker; a utility pit cover; a computer housing; a desk-top computer housing; a portable computer housing; a lap-top computer housing; a palm-held computer housings; a monitor housing; a printer housing; a keyboard; a FAX machine housing; a copier housing; a telephone housing; a phone bezel; a mobile phone housing; a radio sender housing; a radio receiver housing; a light fixture; lighting appliance; reflector; network interface device housing; transformer housing; air conditioner housing; cladding or seating for public transportation; cladding or seating for a train, subway, or bus; a meter housing; antenna housing; cladding for satellite dishes; an coated helmet or item of personal protective equipment; a coated synthetic or natural textile; coated photographic film or photographic print; a coated painted article; coated dyed article; coated fluorescent article; or coated foam article.

19. A multilayer article comprising:
 a coating layer comprising a block copolyestercarbonate comprising structural units derived from unsubstituted resorcinol, a mixture of isophthalic acid and terephthalic acid, and bisphenol A;
 a second layer comprising a bisphenol A polycarbonate optionally containing a colorant;
 an adhesive tielayer selected from the group consisting of a polystyrene-b-poly(styrene-butadiene)-b-polystyrene copolymer; and
 a substrate layer selected from the group consisting of a thermoplastic resin, a thermoset resin, a metal, a ceramic, a glass, and a cellulosic material;
 wherein the coating layer is in contiguous contact with the second layer, and the adhesive tielayer is in contiguous contact with the second layer and the substrate layer; and
 wherein the multilayer article exhibits a ninety-degree peel force of at least 700 Newtons per meter.

20. A multilayer article comprising:
 a coating layer comprising a block copolyestercarbonate comprising structural units derived from unsubstituted resorcinol, a mixture of isophthalic acid and terephthalic acid, and bisphenol A;
 a second layer comprising a bisphenol A polycarbonate optionally containing a colorant;
 an adhesive tielayer selected from the group consisting of polystyrene-b-poly(styrene-butadiene)-b-polystyrene copolymer; and
 a substrate layer selected from the group consisting of a cured, a partially cured and an uncured thermoset resin.

21. The article of claim 20, wherein the thermoset resin is cured or at least partially cured.

22. The article of claim 20, wherein the thermoset resin is uncured.

23. The article of claim 20, wherein the multilayer article exhibits a ninety-degree peel force of at least 700 Newtons per meter after the thermoset resin substrate is cured.

24. A film assembly comprising:
a coating layer comprising a block copolyestercarbonate comprising structural units derived from a 1,3-dihydroxybenzene and an aromatic dicarboxylic acid;
a second layer comprising a polymer comprising carbonate structural units; and
an adhesive tielayer comprising a copolymer with structural units derived from an alkenyl aromatic compound and a conjugated diene comprising a member selected from the group consisting of polystyrene-b-poly(styrene-butadiene)-b-polystyrene copolymer, and a blend of a polystyrene-b-poly(styrene-butadiene)-b-polystyrene copolymer with a polycarbonate.

25. A film assembly comprising:
a coating layer comprising a block copolyestercarbonate comprising structural units derived from unsubstituted resorcinol, a mixture of isophthalic acid and terephthalic acid, and bisphenol A;
a second layer comprising a bisphenol A polycarbonate optionally containing a colorant; and
an adhesive tielayer selected from the group consisting of polystyrene-b-poly(styrene-butadiene)-b-polystyrene copolymer.

26. A method for making a multilayer article comprising
a coating layer comprising a block copolyestercarbonate comprising structural units derived from a 1,3-dihydroxybenzene and an aromatic dicarboxylic acid;
a second layer comprising a polymer comprising carbonate structural units;
an adhesive tielayer comprising a copolymer with structural units derived from an alkenyl aromatic compound and a conjugated diene comprising a member selected from the group consisting of polystyrene-b-poly(styrene-butadiene)-b-polystyrene copolymer, and a blend of polystyrene-b-poly(styrene-butadiene)-b-polystyrene copolymer with a polycarbonate; and
a substrate layer;
wherein the coating layer is in contiguous contact with the second layer, and the adhesive tielayer is in contiguous contact with the second layer and the substrate layer;
which method comprises:
preparing an assembly of coating layer and second layer; and
forming said assembly adjacent to the adhesive tielayer coated onto the substrate layer.

27. The method of claim 26 wherein the assembly of coating layer and second layer is formed by coextrusion or extrusion coating.

28. The method of claim 26 wherein forming said assembly adjacent to the adhesive tielayer is performed by lamination.

29. The method of claim 26 wherein the coating layer comprises a 1,3-dihydroxybenzene selected from the group consisting of unsubstituted resorcinol, 2-methyl resorcinol, and mixtures thereof.

30. The method of claim 27 wherein the aromatic dicarboxylic acid is selected from the group consisting of isophthalic acid, terephthalic acid, naphthalene-2,6-dicarboxylic acid, and mixtures thereof.

31. The method of claim 30 wherein the aromatic dicarboxylic acid is a mixture of isophthalic acid and terephthalic acid wherein the ratio of isophthalic-derived structural units to terephthalic-derived structural units is about 0.25–4.0:1.

32. The method of claim 30 wherein the aromatic dicarboxylic acid is a mixture of isophthalic acid and terephthalic acid wherein the ratio of isophthalic-derived structural units to terephthalic-derived structural units is about 0.40–2.5:1.

33. The method of claim 26 wherein the copolyestercarbonate comprises about 10% to about 99% by weight arylate blocks.

34. The method of claim 26 wherein the copolyestercarbonate comprises about 60% to about 98% by weight arylate blocks.

35. The method of claim 26 wherein the carbonate portion of the copolyestercarbonate comprises structural units derived from bisphenol A.

36. The method of claim 26 wherein the second layer comprises a bisphenol A polycarbonate.

37. The method of claim 26 wherein the second layer further comprises a colorant selected from the group consisting of dyes, pigments, metal flakes, and glass flakes.

38. The method of claim 26 wherein the multilayer article exhibits a ninety-degree peel force of at least 700 Newtons per meter.

39. The method of claim 38 wherein the multilayer article exhibits a ninety-degree peel force of at least 1750 Newtons per meter.

40. The method of claim 26 wherein the substrate layer comprises a material selected from the group consisting of a thermoplastic resin, a thermoset resin, a metal, a ceramic, a glass, and a cellulosic material.

41. The method of claim 40 wherein the substrate layer is selected from the group consisting of a cured, a partially cured and an uncured thermoset resin.

42. The method of claim 26 wherein thicknesses of layers are: a coating layer of about 2–2,500 microns; a second layer of about 2–2,500 microns; and an adhesive tielayer of about 8–2,500 microns.

43. A method for making a multilayer article comprising:
a coating layer comprising a block copolyestercarbonate comprising structural units derived from a 1,3-dihydroxybenzene and an aromatic dicarboxylic acid;
a second layer comprising a polymer comprising carbonate structural units;
an adhesive tielayer comprising a copolymer with structural units derived from an alkenyl aromatic compound and a conjugated diene a member selected from the group consisting of polystyrene-b-poly(styrene-butadiene)-b-polystyrene copolymer, and a blend of polystyrene-b-poly(styrene-butadiene)-b-polystyrene copolymer with a polycarbonate; and
a substrate layer;
wherein the coating layer is in contiguous contact with the second layer, and the adhesive tielayer is in contiguous contact with the second layer and the substrate layer;
which method comprises:
preparing an assembly of coating layer, second layer, and adhesive tielayer; and
forming said assembly to the substrate layer.

44. The method of claim 43 wherein the assembly of coating layer, second layer, and adhesive tielayer is formed by coextrusion or extrusion coating.

45. The method of claim 43 wherein forming said assembly adjacent to the substrate layer is performed by lamination.

46. The method of claim 43 wherein the coating layer comprises a 1,3-dihydroxybenzene selected from the group consisting of unsubstituted resorcinol, 2-methyl resorcinol, and mixtures thereof.

47. The method of claim 43 wherein the aromatic dicarboxylic acid is selected from the group consisting of isophthalic acid, terephthalic acid, naphthalene-2,6-dicarboxylic acid, and mixtures thereof.

48. The method of claim 47 wherein the aromatic dicarboxylic acid is a mixture of isophthalic acid and terephthalic acid wherein the ratio of isophthalic-derived structural units to terephthalic-derived structural units is about 0.25–4.0:1.

49. The method of claim 47 wherein the aromatic dicarboxylic acid is a mixture of isophthalic acid and terephthalic acid wherein the ratio of isophthalic-derived structural units to terephthalic-derived structural units is about 0.40–2.5:1.

50. The method of claim 43 wherein the copolyestercarbonate comprises about 10% to about 99% by weight arylate blocks.

51. The method of claim 43 wherein the copolyestercarbonate comprises about 60% to about 98% by weight arylate blocks.

52. The method of claim 43 wherein the carbonate portion of the copolyestercarbonate comprises structural units derived from bisphenol A.

53. The method of claim 43 wherein the second layer comprises a bisphenol A polycarbonate.

54. The method of claim 43 wherein the second layer further comprises a colorant selected from the group consisting of dyes, pigments, metal flakes, and glass flakes.

55. The method of claim 43 wherein the multilayer article exhibits a ninety-degree peel force of at least 700 Newtons per meter.

56. The method of claim 55 wherein the multilayer article exhibits a ninety-degree peel force of at least 1750 Newtons per meter.

57. The method of claim 43 wherein the substrate layer comprises a material selected from the group consisting of a thermoplastic resin, a thermoset resin, a metal, a ceramic, a glass, and a cellulosic material.

58. The method of claim 57 wherein the substrate layer is selected from the group consisting of a cured, a partially cured and an uncured thermoset resin.

59. The method of claim 43 wherein thicknesses of layers are: a coating layer of about 2–2,500 microns; a second layer of about 2–2,500 microns; and an adhesive tielayer of about 8–2,500 microns.

60. A method for making a multilayer article comprising
a coating layer comprising a block copolyestercarbonate comprising structural units derived from a 1,3-dihydroxybenzene and an aromatic dicarboxylic acid;
a second layer comprising a polymer comprising carbonate structural units;
an adhesive tielayer comprising a copolymer with structural units derived from an alkenyl aromatic compound and a conjugated diene comprising a member selected from the group consisting of polystyrene-b-poly(styrene-butadiene)-b-polystyrene copolymer, and a blend of polystyrene-b-poly(styrene-butadiene)-b-polystyrene copolymer with a polycarbonate; and
a substrate layer comprising an uncured thermoset resin;
wherein the coating layer is in contiguous contact with the second layer, and the adhesive layer is in contiguous contact with the second layer and the substrate layer;
which method comprises:
assembling the coating layer, second layer, adhesive layer, and substrate to form an assembly; and
subjecting the assembly to conditions under which the thermoset is cured.

* * * * *